Sept. 6, 1932.   R. LEE   1,876,507
INTERNAL COMBUSTION ENGINE
Filed Feb. 24, 1930    2 Sheets-Sheet 1
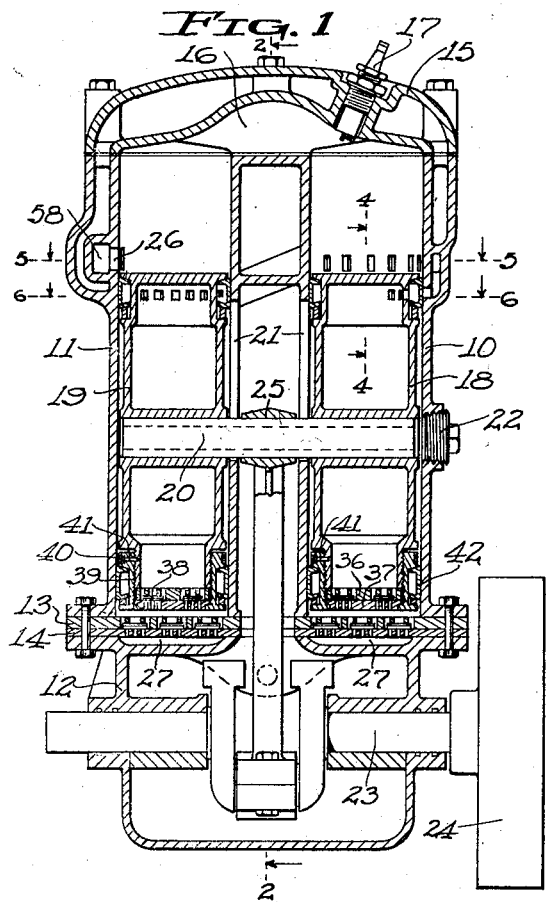
FIG. 1
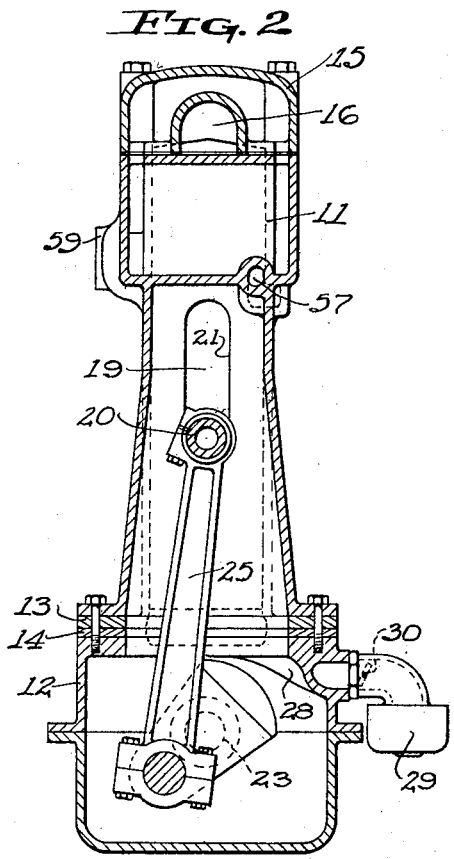
FIG. 2
FIG. 3
FIG. 4
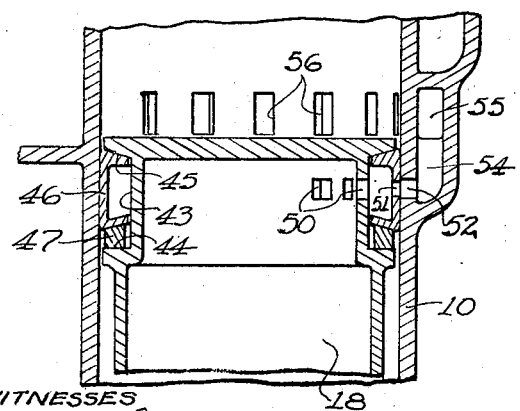
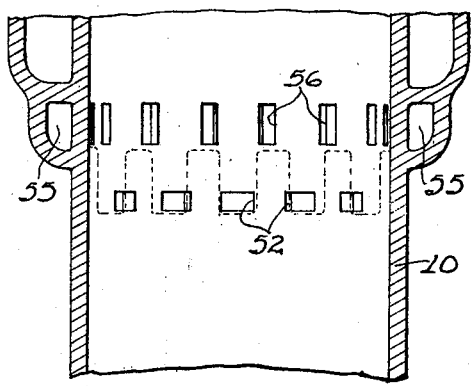

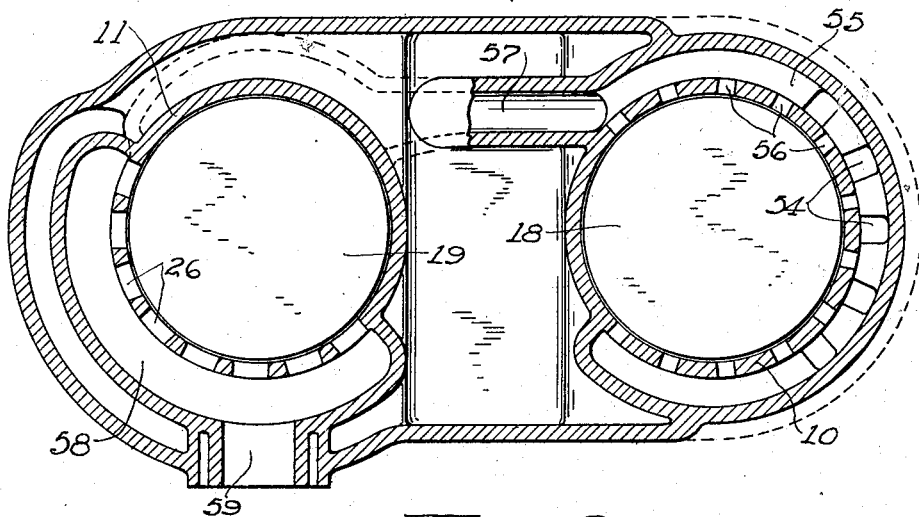
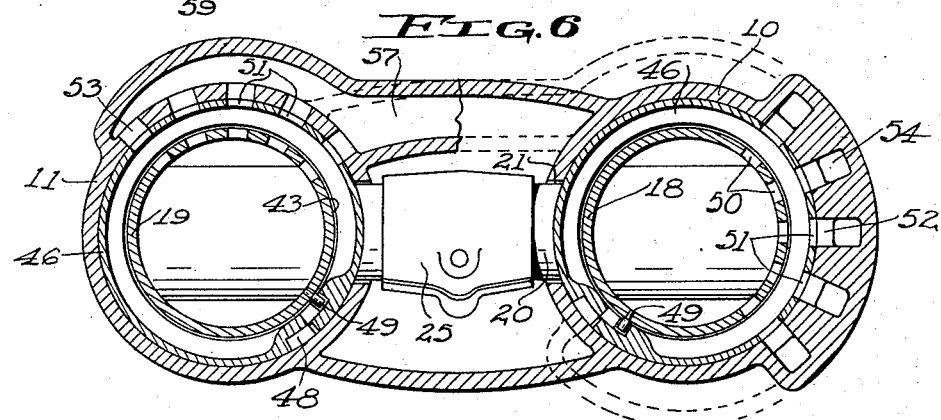
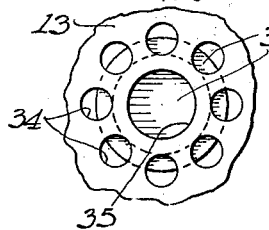
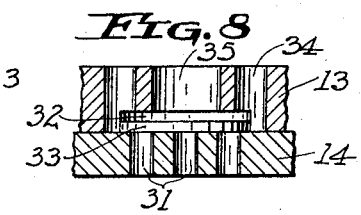
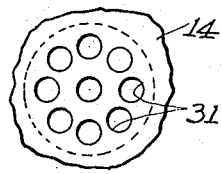
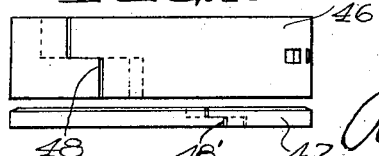

Patented Sept. 6, 1932

1,876,507

UNITED STATES PATENT OFFICE

ROYAL LEE, OF MILWAUKEE, WISCONSIN, ASSIGNOR TO LEE ENGINEERING RESEARCH CORPORATION, OF MILWAUKEE, WISCONSIN, A CORPORATION OF WISCONSIN

INTERNAL COMBUSTION ENGINE

Application filed February 24, 1930. Serial No. 430,822.

The invention relates to internal combustion engines.

An object of the invention is to provide a two-stroke-cycle engine in which the charge flowing to the cylinder is conducted through a port in the piston registrable with the entrance portion of a by-pass in the cylinder, the discharge portion of the by-pass being in communication with the cylinder and being staggered with respect to the entrance portion in order that the piston port will not register with the discharge portion of the by-pass during the travel of the piston, thereby minimizing loss of the pre-compressed charge around the space between the cylinder walls and the piston.

Another object of the invention is to provide an engine in which the piston port is formed in a piston ring to permit the use of high pre-compression pressures without danger of charge leakage and also enable the use of a short by-pass.

A further object of the invention is to provide an engine including two laterally-adjacent cylinders having a common combustion space, the pistons in the cylinders receiving the pre-compressed charge therein and both pistons being ported to co-operate with by-passes conducting the charge into the combustion end of one of the two cylinders.

A further object is to provide an engine in which the piston is equipped with a piston ring of simple but effective construction for retaining the piston centrally within the cylinder out of contact with the cylinder walls, thereby avoiding the noise which would otherwise occur upon the urging of the piston into intermittent lateral engagement with the cylinder walls.

A further object is to provide an engine embodying a piston ring of this type in which the axial play of the ring in its piston groove is automatically taken up.

The invention further consists in the several features hereinafter set forth and more particularly defined by the annexed claims.

In the accompanying drawings, Fig. 1 is a longitudinal sectional elevation of an internal combustion engine embodying the invention;

Fig. 2 is a transverse sectional view thereof taken on the line 2—2 of Fig. 1;

Fig. 3 is a detail sectional view of one of the cylinders and the piston therein;

Fig. 4 is a detail sectional view showing the ported cylinder wall;

Fig. 5 is a transverse sectional view taken along the line 5—5 of Fig. 1;

Fig. 6 is a transverse sectional view taken along the line 6—6 of Fig. 1;

Fig. 7 is a fragmentary detail view of one of the disk valves embodied in the engine;

Fig. 8 is a fragmentary detail sectional view of the valve;

Fig. 9 is a fragmentary detail view of another part of the valve, and

Fig. 10 is a detail view of the two-part piston ring.

In these drawings, 10 and 11 indicate a pair of parallel adjacent cylinders secured to a crank-case 12, there being a pair of valve plates 13 and 14 interposed between the crank-case and the inner ends of the cylinders and forming valve seats as hereinafter described. The cylinders 10 and 11, which may be cast en bloc, have their outer ends closed by a detachable cylinder head 15 to form a common combustion chamber extending between the cylinders, there being an intermediately disposed passage 16 in the cylinder head which forms a substantial part of the engine clearance space. A spark plug 17 is mounted in the cylinder head in the case of operation on carbureted or gaseous fuel, and is preferably disposed adjacent the combustion space of the cylinder 10 into which a pre-compressed charge is introduced as hereinafter described. The cylinders 10 and 11 and the cylinder head 15 may be provided with suitable water jackets, as shown, for cooling purposes.

A pair of hollow trunk pistons 18 and 19 are mounted for reciprocation in the cylinders 10 and 11 respectively, and are connected at their intermediate portions by a common piston pin 20 extending between them and through slots 21 in the adjacent cylinder walls. In order to facilitate the introduction of the piston pin, an aperture may be formed in one of the cylinder walls at a point diametrically opposite the slot 21, the aperture being normally closed by a threaded plug 22.

A crank shaft 23 is journalled in the crank-case 12 and carries a suitable fly-wheel 24. The crank shaft 23 is operatively connected to the piston pin 20 by a connecting rod 25 disposed in the space between the cylinders.

In accordance with well known practice, the pistons 18 and 19 are movable simultaneously outwardly on a compression stroke and simultaneously inwardly on an explosion or power stroke, at the conclusion of which a pre-compressed charge is admitted into one cylinder and flows through the common combustion chamber into the other cylinder, driving the spent gases before it. In the present instance, the spent gases are exhausted through ports 26 in the cylinder 11, these ports being uncovered by the piston 19 near the end of the explosion or power stroke. For effecting pre-compression of the charge, it is convenient to use the pistons 18 and 19 acting on their inward stroke, which, in general, is also common practice.

In the present embodiment of the invention, the crank-case is provided with a pair of shallow recesses 27 in axial alignment with the cylinders 10 and 11 and connected by a manifold 28 to a carbureter 29 including a throttle valve 30. The carbureter is provided in case of operation on carbureted fuel, although the invention is not limited to such operation, as the fuel may be introduced by injection into the cylinders and only air supplied to the recesses 27. The recesses 27 are closed at their upper sides by the valve plate 14, which is provided above each recess with sets of bores or ports 31. The upper valve plate 13, which forms the end walls of the pre-compression chambers, is in engagement with the valve plate 14 and is provided with shallow bores 32 in its lower surface, each registering with a set of the bores 31 in the lower valve plate 14. A disk valve 33 is mounted and guided for limited movement in each bore 32, as seen in Fig. 8. Transverse bores or ports 34 are formed in the valve plate 13 and have their lower ends intersecting the circumference of the shallow bore 32, and a larger bore 35 is formed in the valve plate 13 in axial alignment with the shallow bore 32. Each disk valve 33, which is formed of light, thin metal, in its lower position closes the set of ports 31 therebelow, and in its upper position places the ports 31 in communication with the ports 34. The larger openings 35 in the valve plate 13 insure the prompt closing of the disk valves 33 when the pressure in the lower ends of the cylinders 10 and 11 exceeds the pressure in the manifold recesses 27.

The upward or outward movement of the pistons 18 and 19 is utilized to draw carbureted air from the recesses 27 into the pre-compression chambers formed in the lower ends of the cylinders, the disk valves 33 being lifted by the suction produced to permit the carbureted air to flow through the openings 31 in the lower valve plate 14 and thence through the openings 34 in the upper valve plate 13. Following the downward explosion or power stroke of the pistons, the charge is transferred from the lower ends of the cylinders to the upper ends of the cylinders, and this is accomplished in the present instance by admitting the charge into the hollow interior of the pistons and thence into the combustion end of the cylinder 10. The lower or inner end of each of the pistons 18 and 19 is provided with a pair of abutting upper and lower valve seat plates 36 and 37 which are apertured similarly to the valve plates 13 and 14 and carry between them in the same relation a plurality of disk valves 38, these valves being mounted for limited movement between the valve seat plates and in their lower position closing the space within the pistons with respect to pre-compression chambers. The valve seat plates at the lower or inner end of each piston are held in position by means of an inwardly flanged annular band 39 threaded onto the piston. Each band 39 is held on the piston against relative rotation in any suitable manner as by means of a resilient ring 40 mounted in a groove in the band and carrying an inwardly projecting locking pin 41 which extends through the band and into the piston, as seen in Fig. 1. Each band is circumferentially grooved to carry a two-part piston ring 42 constructed as hereinafter described.

The upper or outer end portion of each piston is provided with a wide peripheral groove 43, one end wall 44 of which is flat, while the other end wall 45 is conical, the latter end wall making an obtuse angle with the bottom wall of the groove. A piston ring 46 and take-up ring 47 are mounted in the groove 43 in laterally adjacent relation. As best seen in Fig. 3, the piston ring 46 has conically formed opposite edge faces, one of which bears against the conical end wall 45 of the groove 43 and the other of which bears against a conical edge face of the take-up ring 47, the other edge face of the take-up ring being flat and resting against the end wall 44 of the groove. The resilience of the piston ring 46 urges it outwardly against the cylinder walls, and the resilience of the take-up ring 47, which is smaller in diameter than the piston ring, urges it against the adjacent conical edge face of the piston ring to not only take up the side play of the rings in the groove 43 but also to maintain the piston ring 46 centrally of the piston in such manner as to resist lateral displacement of the piston into contact with cylinder walls. The two-part piston ring 42 at the other end of the piston is similarly constructed to hold the piston centrally within the cylinder out of contact with the cylinder walls. In this manner, piston knock and piston slap are avoided regardless of various influences such as the alternating lateral thrust imposed on the pistons. The joints 48 and 48' in the piston ring and the take-up ring, respectively, are each preferably of the step-cut type in which there is a step both in the width and in the depth of the ring, as seen in Figs. 6 and 10. Each piston ring is preferably held against rotation in its groove by means of a pin 49 entering the piston wall and one of the inner recesses at the joint of the ring.

The upper or outer portions of each piston are provided with ports 50 communicating with the interior space of the piston rings 46, which latter have a channel-shaped cross-section. Each piston ring 46 is provided in its outer side wall with ports 51 which are registrable with ports 52 and 53 formed respectively in the cylinder walls of the cylinders 10 and 11. Each cylinder port 52 communicates with a short upwardly-extending by-pass 54 which, at its upper end, opens into a manifold passage 55 extending about the greater portion of the cylinder 10. A plurality of ports 56 are formed in the cylinder wall 10 in communication with the manifold 55 and are staggered with respect to the ports 52 therebelow, as seen in Fig. 4, in order that the piston ring ports 51 will register only with the cylinder ports 52 and not with the cylinder ports 56, during the travel of the piston. The piston rings 46 are wide enough so that the ports 52 and 53 in the cylinder walls will be completely covered by the unported portions of the piston rings during the travel of the pistons, thereby avoiding undesirable by-passing of the pre-compressed charge into the open space between the piston and cylinder walls. The ports 53 in the cylinder 11 open into a manifold passage 57 which extends between the cylinders and communicates with the manifold 55. The exhaust ports 26 in the cylinder 11 open into an exhaust manifold 58 provided with a discharge opening 59.

In operation, the simultaneous outward or upward movement of the pistons 18 and 19 creates a partial vacuum in the lower ends of the cylinders which causes the disk valves 33 to lift and admit carbureted air from the recesses 27 through the openings 31 of the valve plate 14 and thence through the openings 34 of the valve plate 13 and into the pre-compression chambers. During this travel of the pistons, the disk valves 38 in the lower ends of the pistons seat against their respective valve plates 37 to close the openings or ports therein. As soon as the pistons commence their simultaneous inward or downward stroke, the disk valves 33 immediately drop into seating engagement with the valve plate 14, permitting pre-compression of the trapped charge in the lower ends of the cylinders. When the pressure of the trapped charge exceeds the pressure within the hollow pistons, the disk valves 38 in the lower ends of the pistons are caused to open, thereby forcing the charge into the interior of the pistons as the pistons move downwardly. The clearance at the lower ends of the pistons is made as small as possible in order to obtain good volumetric efficiency and relatively high pre-compression. When the pistons reach the lower ends of their strokes, the ports 51 in the piston rings 46 at the upper ends of the pistons register with the ports 52 and 53 formed in the walls of the cylinders 10 and 11, and the pre-compressed charge within the pistons thereupon flows through these ports and through the manifolds 55 and 57. The charge then flows into the cylinder 10 from the ports 56 and passes upwardly into the cylinder 10, across the combustion space 16 and downwardly into the upper end of the cylinder 11. The charge thus forced into the upper ends of the cylinders is then compressed on the subsequent upward stroke of the pistons, the ports 56 being closed as the piston moves upwardly. Simultaneously, a new charge is drawn in at the lower ends of the cylinders in the manner above described. When the pistons reach the upper end of their stroke, ignition takes place and the explosion of the charge causes the downward travel of the pistons on their working or power stroke. When the piston 19 approaches its lowermost position, it uncovers the exhaust ports 26, thereby permitting the spent gases to escape into the manifold 58 and out through the opening 59. The exhaust ports 26 are uncovered shortly before the intake ports 56 are uncovered, and as soon as the ports in the piston rings register with the ports 52 and 53 in the cylinder walls, the pre-compressed charge, which is under considerable pressure, flows upwardly into the cylinder 10, through the common combustion space 16, and downwardly into the upper end of the cylinder 11, driving the spent gases before it and forcing it out of the exhaust ports 26.

In previous types of engines employing base or crank-case construction, it has been customary to conduct the pre-compressed charge to the combustion chamber by means of a by-pass including ports in the cylinder walls uncovered by the piston in its travel. With the usual by-passing arrangements, it has been found impossible to employ a high degree of pre-compression because of excessive leakage of the charge around the piston and through the exhaust ports or slots in the cylinder walls, or both, as the case may be. With the construction of the present invention, including short and properly sealed by-passes, it is possible to employ a relatively high degree of charge pre-compression, since charge leakage is minimized.

The amount of charge pre-compression is variable according to the engine speed and load. At small throttle openings of the carbureter, the charge which accumulates within the pistons is at somewhat less pressure than at full throttle openings, thus permitting satisfactory operation at low speed and at light loads. With large throttle openings, the pressure of the charge accumulating within the pistons reaches relatively high values, thereby permitting operation at high speeds with sustained torque, because of the rapid scavenging and full charging afforded.

By admitting the charge into the piston 10 around a substantial part of its periphery, good scavenging is provided and dilution is minimized. Under conditions of light load where the pre-compressed charge entering the cylinders does not reach the volume attained under normal load conditions, the same action occurs as to cylinder 10 and any spent gases then remaining are confined to cylinder 11 and part of the combustion space 16, which preferably extends above the spark plug electrodes to accommodate the major portion of the compressed charge. A spark plug 17 occupies a position over the cylinder 10 so that ignition takes place in an undiluted portion of the charge, even when the amount of charge admitted to the cylinders is relatively small.

Instead of discharging the pre-compressed charge from the outer ends of both pistons, it is possible to omit the discharge ports of one of the pistons and to discharge the contents of both pistons from the other piston, preferably the piston 18. This can be readily accomplished by placing the two pistons in communication through a hollow piston pin, as disclosed in my co-pending application for Letters Patent for internal combustion engines, Serial No. 127,040, filed August 4, 1926, now matured into United States Letters Patent No. 1,776,441, dated September 23, 1930.

The manifold 55, which partially surrounds the cylinder 10, is preferably of comparatively small volume to minimize loss of charge during engine operation. The by-passes 54 instead of communicating with the manifold 55 may communicate directly and individually with the ports 56, thus eliminating the need for the greater part of the manifold 55. If all of the charge is conducted to the cylinder 10 from one of the pistons, as suggested above, it is possible to completely eliminate the manifold 55.

In some instances, where a lesser degree of pre-compression can be tolerated, the lower ends of the pistons 18 and 19 may be left open instead of being valved.

What I claim as new and desire to secure by Letters Patent is:

1. In an internal combustion engine, the combination of a cylinder provided with a by-pass having inlet and discharge portions opening into the cylinder wall at points spaced axially and circumferentially with respect to the cylinder, and a charge-receiving piston movable in said cylinder and having a port registrable with the inlet portions of said by-pass for admitting a charge into said by-pass and from said by-pass into said cylinder, the line of travel of said piston port being out of register with the discharge portions of said by-pass to prevent communication between said piston port and the discharge portions of said by-pass.

2. In an internal combustion engine, the combination of a cylinder provided with a relatively short by-pass having inlet and discharge portions opening into the cylinder wall at points spaced axially and circumferentially with respect to the cylinder, and a charge-receiving piston movable in said cylinder and having a port adjacent its head registrable with the inlet portions of said by-pass for admitting a charge into said by-pass and from said by-pass into said cylinder, the line of travel of said piston port being out of register with the discharge portions of said by-pass to prevent communication between said piston port and the discharge portions of said by-pass.

3. In an internal combustion engine, the combination of a cylinder provided with a by-pass having inlet and discharge portions opening into the cylinder wall at points spaced axially and circumferentially with respect to the cylinder, a charge-receiving piston movable in said cylinder, a piston ring mounted on said piston and having a port therein receiving therethrough a charge from within the piston and registrable with the inlet portions of said by-pass for admitting a charge into said by-pass and from said by-pass into said cylinder, the line of travel of said piston ring port being out of register with the discharge portions of said by-pass.

4. In an internal combustion engine, the combination of a cylinder having a port, a charge-receiving piston movable in said cylinder, and a piston ring mounted on said piston and having a port registrable with said cylinder port for admitting therein a charge from within the piston.

5. In an internal combustion engine, the combination of a pair of cylinders having a common combustion space, pistons movable in said cylinders and each having a port, and charge pre-compression means including said pistons, there being a by-pass port in each cylinder registrable with said respective piston ports, said by-pass ports both communicating with one of said cylinders for admitting the pre-compressed charge therein.

6. In an internal combustion engine, the combination of a pair of cylinders having a common combustion space, pistons movable in said cylinders and each having a plurality of ports, and charge pre-compression means including said pistons, there being a plurality of ports in each cylinder registrable with said piston ports and communicating with a plurality of intake ports in one of said cylinders for conducting the pre-compressed charge into said cylinder.

7. In an internal combustion engine, the combination of a pair of cylinders having a common combustion chamber, pistons movable in said cylinders, charge pre-compression means including said pistons, and means including valve means for each piston for conducting the pre-compressed charge from both of said pistons into one of said cylinders.

8. In an internal combustion engine, the combination of a pair of cylinders having a common combustion chamber, a manifold disposed about one of said cylinders and having a plurality of ports for admitting the charge into said cylinder, pistons movable in said cylinders, charge pre-compression means including said pistons, and valve means for each piston admitting the pre-compressed charge from within said pistons into said manifold.

9. In an internal combustion engine, the combination of a cylinder having a port, a charge-receiving piston movable in said cylinder and having a circumferential groove communicating with the piston interior, a piston ring mounted in said groove and having a port registrable with said cylinder port for admitting therein a charge from within the piston, and means for taking up the side play of said piston ring within said groove.

10. In an internal combustion engine, the combination of a cylinder, by-pass means for said cylinder including inlet and discharge ports opening into the cylinder at points spaced axially and circumferentially with respect to the cylinder, and a charge-receiving piston movable in said cylinder and having a port registrable with said inlet port for admitting a charge into said cylinder through said discharge port, the line of travel of said piston port being out of register with the discharge port to prevent communication between said ports.

11. In an internal combustion engine, the combination of a cylinder, a piston movable in said cylinder and having a circumferential groove, a piston ring mounted in said groove and engageable with the cylinder walls, and means including said piston ring for maintaining the piston centrally within the cylinder out of contact with the cylinder walls.

12. In an internal combustion engine, the combination of a cylinder, a piston movable in said cylinder and having a circumferential groove, one side wall of which is conical and the opposite side wall of which is flat, a piston ring narrower than said groove mounted in said groove and having opposite outwardly diverging conical edge walls one of which is in engagement with the conical side wall of said groove, and a take-up ring mounted in said groove and having a flat edge wall engageable with the flat side wall of said groove and an opposite conical edge wall engageable with the conical edge wall of said piston ring.

13. In an internal combustion engine, the combination of a cylinder having a port, a piston movable in said cylinder, and a piston ring mounted on said piston against relative axial movement and having a port registrable with said cylinder port, the outer surface of said piston ring between said port and the edge of the ring being wider than said cylinder port, whereby to seal said cylinder port during the travel of said piston.

In testimony whereof, I affix my signature.

ROYAL LEE.